B. J. DIPLOCK.
VEHICLE.
APPLICATION FILED JULY 1, 1912.

1,096,893.

Patented May 19, 1914.
6 SHEETS—SHEET 1.

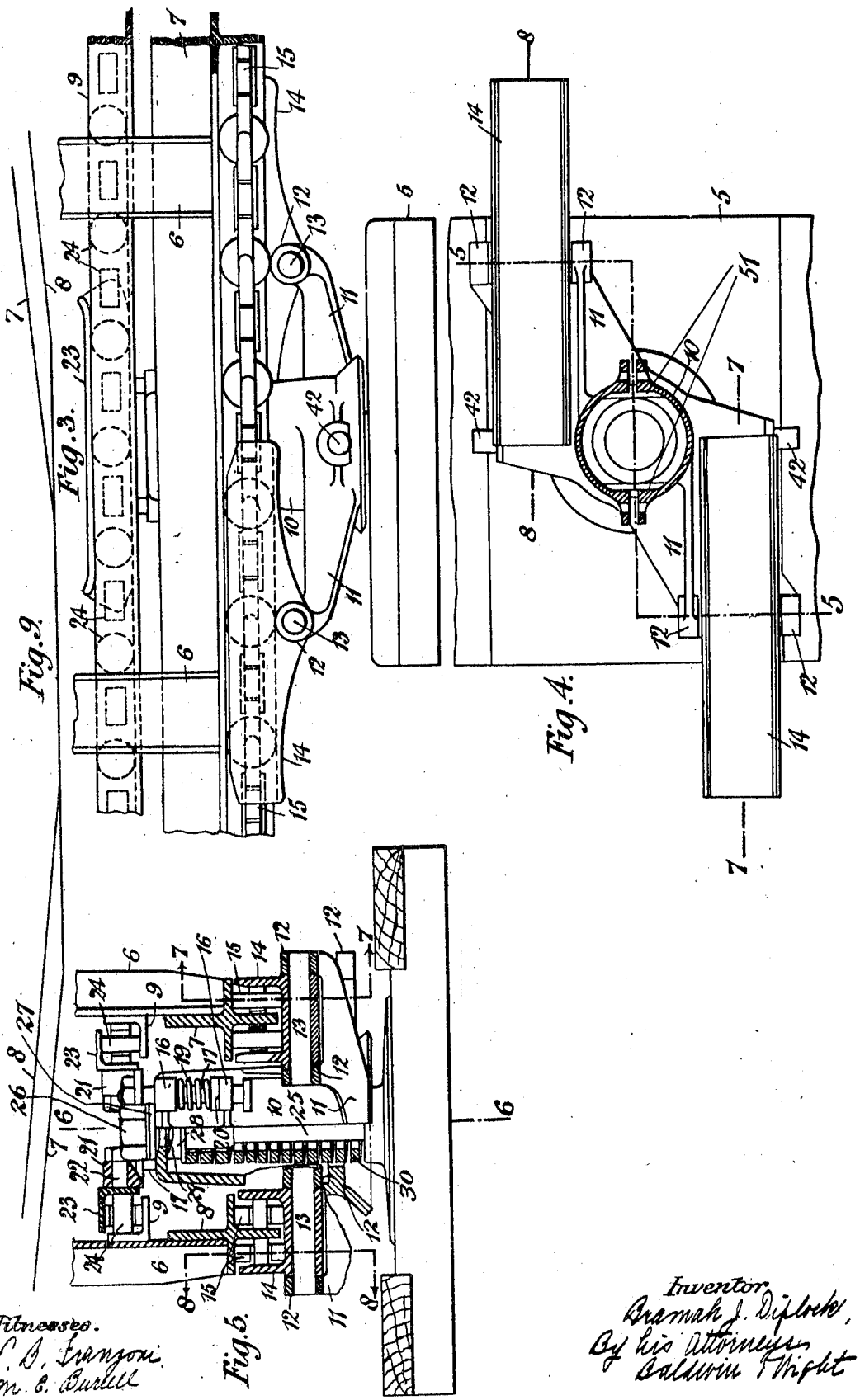

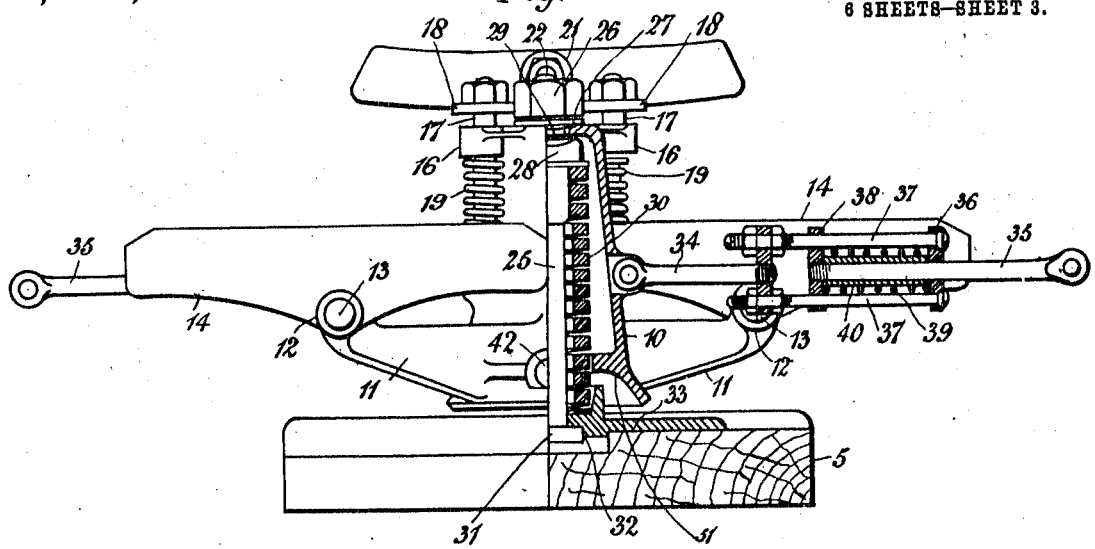
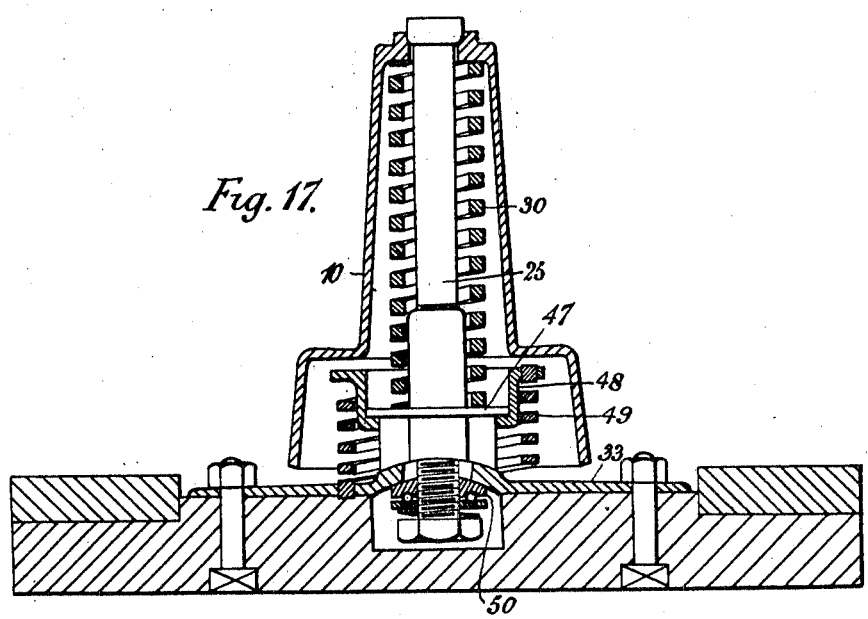
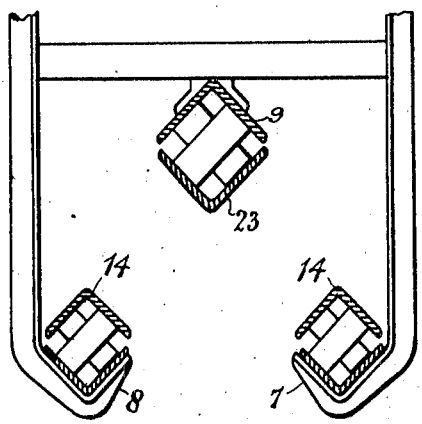

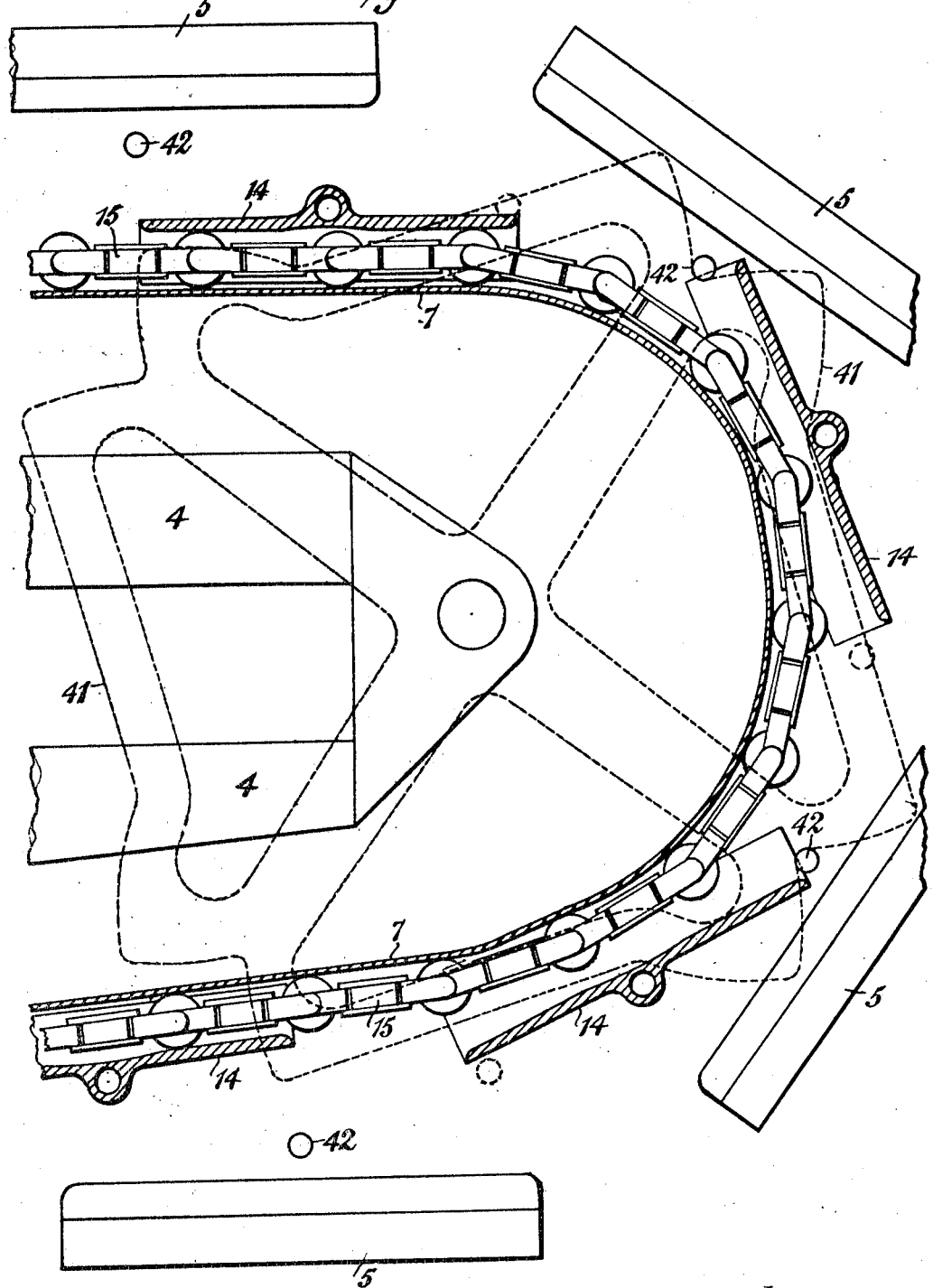

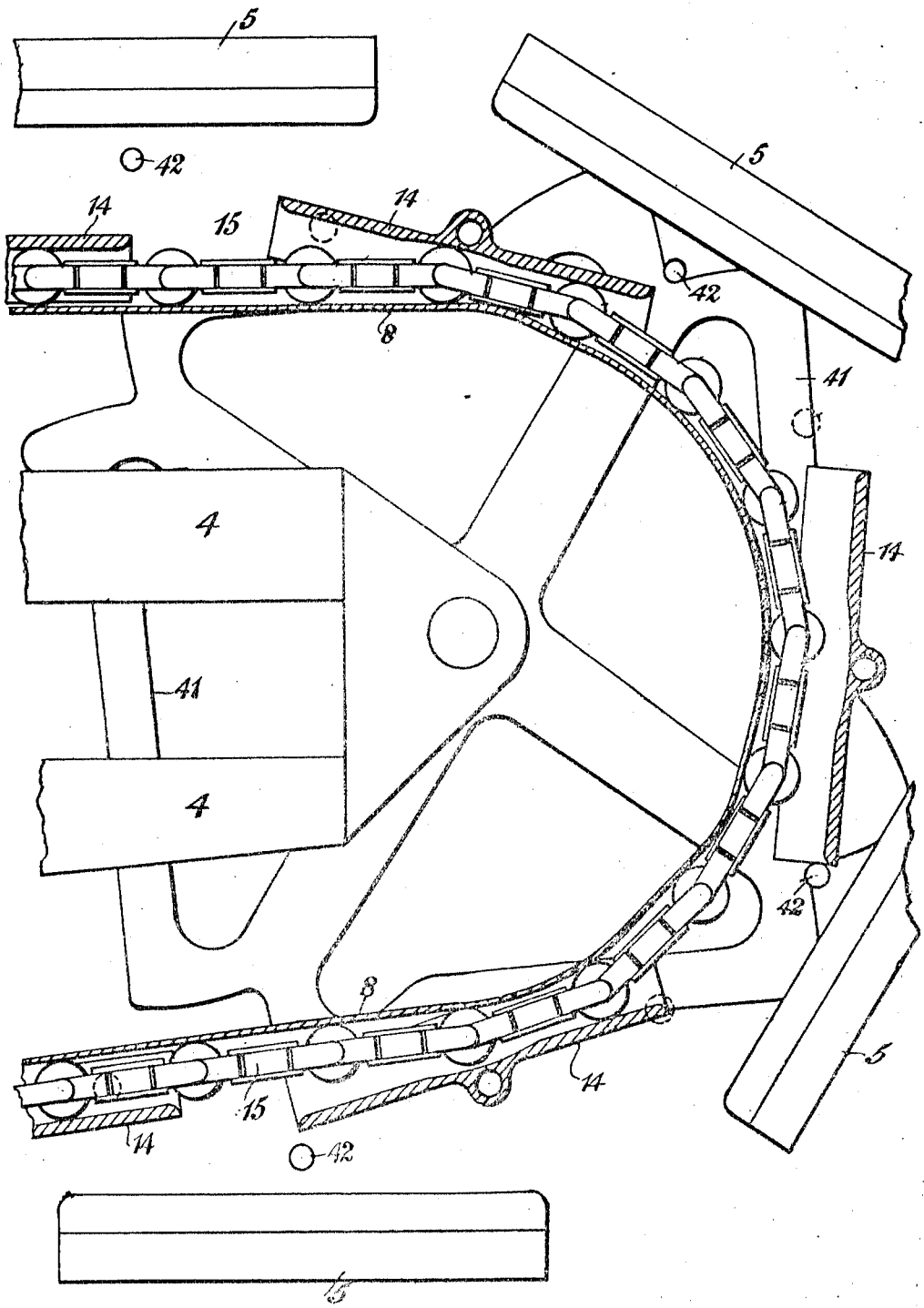

B. J. DIPLOCK.
VEHICLE.
APPLICATION FILED JULY 1, 1912.

1,096,893.

Patented May 19, 1914.
6 SHEETS—SHEET 6.

Witnesses.

Inventor
Bramah J. Diplock

UNITED STATES PATENT OFFICE.

BRAMAH JOSEPH DIPLOCK, OF FULHAM, ENGLAND.

VEHICLE.

1,096,893.  Specification of Letters Patent.  Patented May 19, 1914.

Application filed July 1, 1912. Serial No. 707,135.

*To all whom it may concern:*

Be it known that I, BRAMAH JOSEPH DIPLOCK, a subject of the King of Great Britain, residing at 3 Wyfold road, Munster road, Fulham, in the county of Middlesex, England, have invented new and useful Improvements in Vehicles, of which the following is a specification.

This invention relates to vehicles of the well known type which are supported on endless chains of feet running on rails carried by the body of the vehicle. According to the present invention each foot is carried by the lower end of a rod the upper end of which is suspended from the apex of a carrier. The sideway play of the foot required when the vehicle is turning is obtained by the movement of the rod within the carrier while the tilting of the foot is provided for in its connection to the lower end of the rod. Each carrier may be provided with rollers running on the rails but preferably it has pivoted to it two or more slippers which bear on roller chains running on the rails. According to the present invention such chains have springs interposed between the rollers. This allows the slippers to run at slightly different speeds and thus obviates the loss by friction which necessarily takes place with an inextensible roller chain. When the chain is relieved from pressure the springs bring the rollers back to their normal positions at equal distances apart. According to the present invention also such roller chains are made with two sets of rollers preferably at right angles to each other and running on two rails so that the chain is prevented from moving transversely in any direction without the use of flanges and loss by flange friction is avoided.

Figure 1:
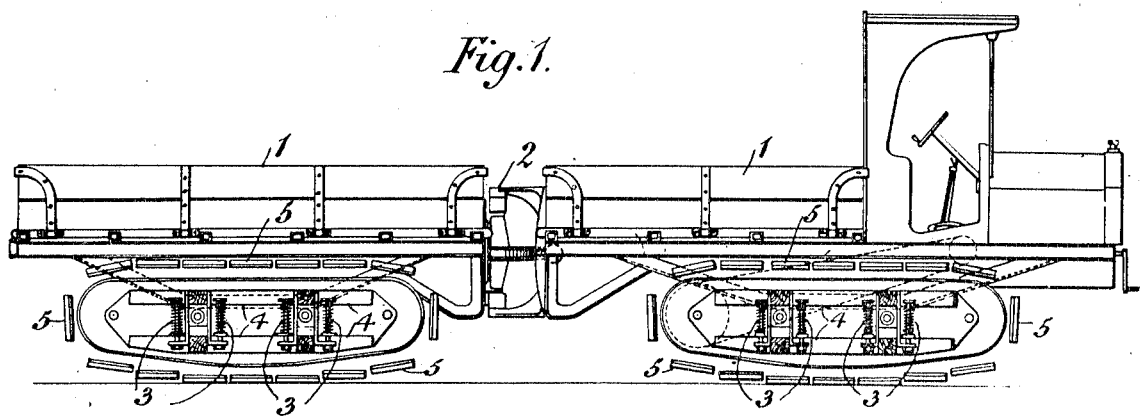
Figure 2:
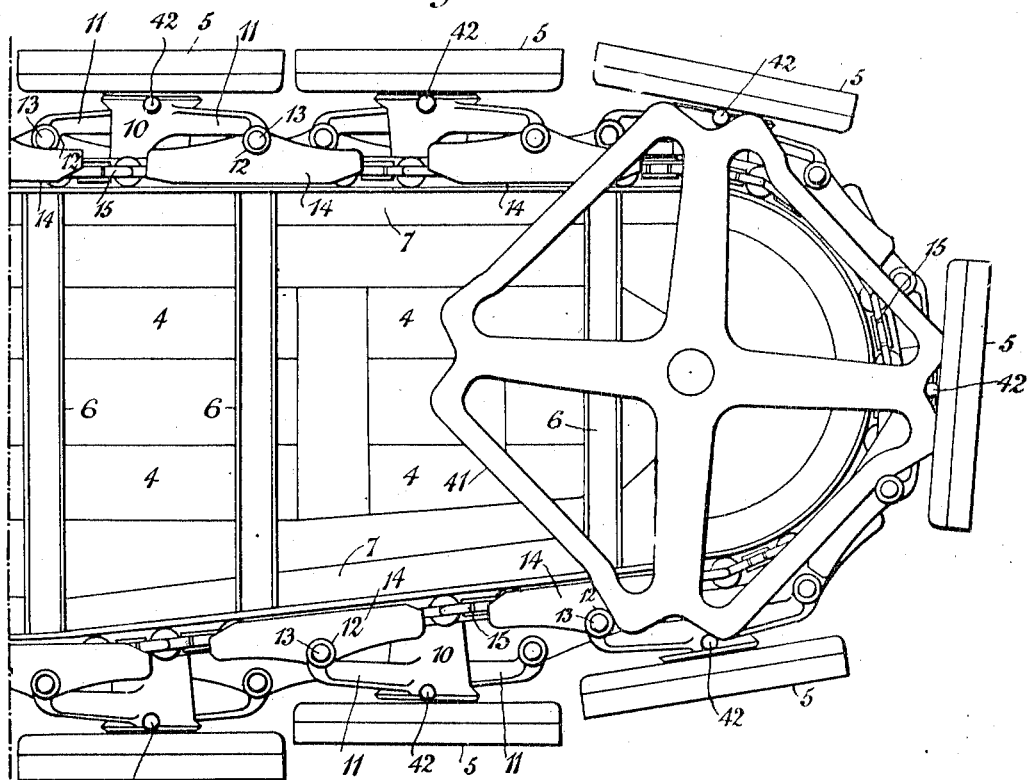
Figure 10:
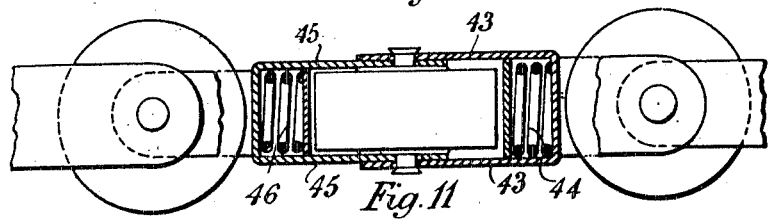
Figure 11:
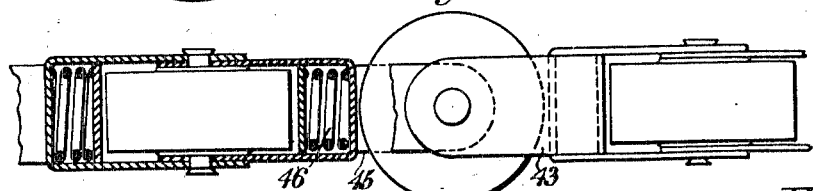
Figure 14:
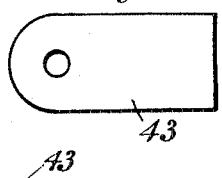
Figure 15:
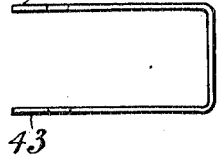
Figure 16:
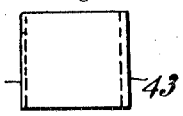
Figure 19:
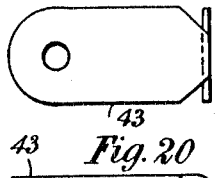
Figure 20:
Figure 21:
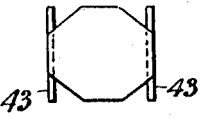
Figure 12:
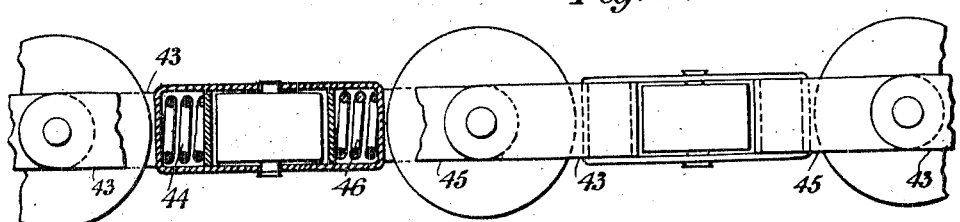
Figure 13:
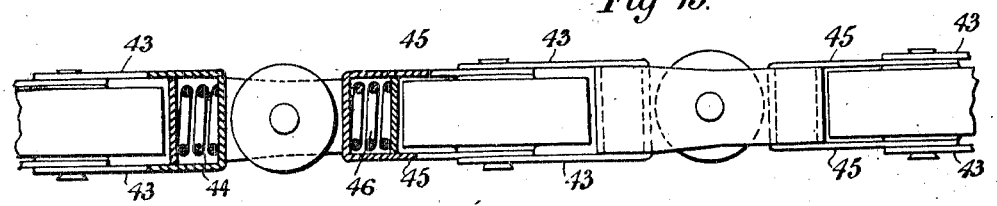

Figure 1 is a diagrammatic side elevation of a motor vehicle constructed according to this invention. Fig. 2 is a part elevation of one endless chain of feet with the mechanism connected therewith. Fig. 3 is a similar side elevation (to a larger scale) showing only a single foot. Fig. 4 is a sectional plan of the foot (Fig. 3). Fig. 5 is a view mainly in section on the line 5—5 of Fig. 4 with some parts omitted. Fig. 6 is a section on the line 6—6, Fig. 5. Figs. 7 and 8 are part longitudinal vertical sections the planes of section being indicated by the lines 7—7 and 8—8, Figs. 4 and 5. In Fig. 7 all the parts behind the plane of section are omitted and the sprocket wheel which is in front of the plane of section is shown in dotted lines. In both figures the inner rails 9 and many other parts are omitted. Fig. 9 is a diagram showing the inclination of the rails. Figs. 10 and 11 are respectively a sectional side elevation and a sectional plan (both to a larger scale) of one of the upper chains (Figs. 3 and 5), and Figs. 12 and 13 are similar views of one of the lower chains. Figs. 14, 15 and 16 show one of the plates forming the links of the chain Figs. 10 and 11. Fig. 17 shows a modified arrangement of carrier, rod, foot and springs. Fig. 18 shows a modified arrangement of slippers and chains. Figs. 19, 20 and 21 show one of the plates forming the links of the chain, Fig. 18.

The body 1 of the vehicle, Fig. 1, is divided into two halves pivoted together at 2 the vehicle being steered in the well known way by turning one half relatively to the other about the pivot. Each half of the body 1 is supported by springs 3 on two wooden frameworks 4 to each side of each of which is fixed a frame the two pairs of frames being supported on two endless chains of feet 5.

As shown at Fig. 2 each frame consists of channel bars 6 to which the rails 7 (or 8) and 9 (see Figs. 3 and 5) are fixed. The rails 7 and 8 are of cross shaped section while the rails 9 are angle bars. Each foot carrier consists of a bell 10 having two arms 11 projecting from its bottom. Each arm 11 has at its end two bearings 12 to receive a pin 13 which forms the pivot of a slipper 14. Interposed between the rails 7 and 8 and the slippers 14 are double roller spring chains 15 which will be hereinafter described with reference to Figs. 12 and 13. 16, 16 are bosses projecting from the upper part of the bell 10 and acting as guides for the pins 17 (Fig. 5) projecting downward from the underside of the plate 18. 19 are compressed springs bearing on nuts 20 fixed to the pins 17 and on the upper bosses 16, these springs therefore tend to draw the plate 13 downward, the motion being limited by the bosses 16. The plate 18 has fixed to it bearings 21 to receive the pivot pins 22 of the slippers 23. Interposed between the slippers 23 and the rails 9 are double roller spring chains 24 which will be hereinafter described with reference to Figs. 10 and 11. It will be seen that the effect of the springs 19 is to draw the slippers 14 and 23 toward each other and hold them in contact with their roller chains and the roller chains in contact with their rails. Since one slipper 14 is in advance of the other it is necessary (in order to hold the bells vertical and the feet horizontal as they are approaching the ground as shown at Fig. 2) to bend the rails 7 and 8 to the form shown diagrammatically at Fig. 9 which is to the same scale as Fig. 2. It will be seen that the two bottom feet in Fig. 2 are horizontal and the two pivots 13 of the slipper 14 of each foot are consequently in the same horizontal line. Now it must be remembered that the left hand slipper of each foot is running on the front rail 7 which is seen while the right hand slippers are running on the back rail 8 which is hidden. It therefore follows that the part of the rail 8 immediately above the right hand pivot 13 is at the same level as the part of the rail 7 immediately above the left hand pivot 13. Hence the form of the rails shown at Fig. 9:—any horizontal line will cut the rails 7 and 8 at points a distance apart equal to the distance between the pivots 13 of each foot. It will be seen that the form of the front and rear parts of the rail 7 are the same as those of the rear and front parts of the rail 8 so that all four of the frames on which each half of the vehicle is supported are exactly the same, two of them being simply turned end for end relatively to the other two.

The method of suspending the foot 5 from the bell 10 is best seen at Fig. 6. 25 is a rod passing out through a hole at the apex of the bell. 26 is a nut and 27 a washer on the rod 25, a spring (not shown) being preferably interposed between the nut and washer. The underside of the washer 27 is spherical and fits into a spherical recess at the top of the bell. 28 is a second nut on the rod 25 the top of which has a spherical recess in it to receive the spherical underside of a washer 29 the top of which bears against the apex of the bell. 30 is a compressed spring surrounding the lower part of the rod 25 and of the nut 28, its upper end bearing against a flange on the nut. The lower end of the rod 25 has a head 31 fixed to it. The head 31 is received in a recess 32 in the foot 5 being kept in place by a cover plate 33 fixed to the foot. The recess 32 is larger than the head 31 so that the foot 5 can tilt relatively to the rod 25 but since the top of the head 31 bears against the underside of the cover 33 while the spring 30 bears on the top of the cover, the foot is normally kept at right angles to the rod. Each side of each half of the vehicle is normally supported alternately on an odd and even number of feet (as shown at Fig. 1 the number is alternately two and three) and the power and compression of the springs 30 should be such that even when the lesser number of springs is in action their length is not affected by the load but when owing to any inequality of the ground the vehicle is supported on a still less number of feet then the springs 30 are further compressed to allow the other feet to touch the ground.

As shown at Figs. 4 and 6 the spring 30 and rod 25 is prevented from swinging forward or backward in the bell 10 by guides 51 but it is free to move to and fro transversely. Fig. 6 also shows the way in which the bells 10 are connected together. 34 is a link pivoted to the front of one bell and 35 is a link pivoted to the rear of the adjacent bell. 36 is a plate connected by the rods 37 to the link 34 and 38 is a plate fixed to the link 35. 39 is a compressed spring tending to force the plates 36 and 38 apart. 40 is a sleeve surrounding the link 35, its ends abutting against the plates 36 and 38. It will be seen that with this arrangement the two bells can be drawn toward each other by the spring 39 but are prevented by the sleeve 40 from separating for a greater distance than that shown. The carriers should be at their maximum distance apart when passing around the sprocket wheels.

Figs. 2, 7 and 8 show the sprocket wheels 41 at the ends of the frames. These sprocket wheels engage with pins 42 (see Figs. 3, 4 and 6) fixed to the sides of the bottoms of the bells. As is clearly shown at Figs. 7 and 8, the sprocket wheels 41 and rails 7 and 8 are so formed that the slippers 14 are separated from the chains 15 and the arrangement is such that the slippers are simultaneously separated from the two chains of each bell in spite of the fact of one slipper being in advance of the other. The pressure on the roller chain 24 is at this point relieved by the rail 9 being so formed that the chain is in contact only with the slippers 23 when the carriers are engaged with the sprocket wheels. The object of thus separating the slippers 14 from the chains and the chains 24 from the rails is to allow the springs of the chains to act and bring any rollers which may have been displaced back to their normal positions at equal distances apart. Figs. 7 and 8 each show one set of slippers but the positions of the pivots of the other set are also indicated. As shown the middle part of each slipper is only slightly concave but preferably the concavity should be considerably greater and sufficient to insure that the slipper is always in contact with at least two rollers one on each side of its pivot even when it is traveling in a curve.

The construction of the spring chains 15 is shown to an enlarged scale at Figs. 10 and 11. Each roller is connected to the roller on one side of it by two exactly similar bent plates 43 (one of which is shown at Figs. 14 to 16) the two plates forming a box in which the spring 44 is inclosed. Each roller is connected to the roller on the other side of it by two plates 45 similar to but somewhat narrower than that shown at Figs. 14 to 16. 46 is a spring inclosed between the plates 45. The spring chain 24 is shown at Figs. 12 and 13. Its construction is similar to that of the chain 15 but in this case one set of rollers is smaller than the other.

The details of the invention can be varied in many ways. For example Fig. 17 shows one of many possible modifications of the way in which the foot can be suspended from the bell while Fig. 18 shows diagrammatically one of many possible arrangements of the rails, slippers and spring chains. In Fig. 17 one end of the compressed spring 30 bears against and normally holds the rod at right angles to the top of the carrier while the other end bears against a nut 47 fixed to the rod 25. This rod has a rectangular head working in a rectangular recess in the apex of the bell so that it is prevented from turning axially. 48 is a cup on the nut 47 and 49 is a compressed spring bearing on the cup 48 and the cover plate 33. In this case the cover plate 33 has a spherical recess in it to receive the spherical washer 50 on the lower end of the rod 25.

In Fig. 18 the bearing surfaces of the rails and slippers in place of being horizontal and vertical are inclined. There is also only a single rail 9 and slipper 23. In this case in order to allow the chains to bend in going around the ends of the frames it is necessary to cut away the corners of the plates of which they are made as shown at Figs. 19 to 21. In this case also when the carriers are upon the sprocket wheels the slipper 23 separates from its chain and the other chains separate from the rails 7 and 8.

What I claim is:—

1. The combination of a foot carrier, a slipper on the carrier, a rail, and a spring roller chain interposed between the slipper and the rail.

2. The combination of a foot carrier, a foot pivoted to the carrier, a slipper having two bearing faces also pivoted to the carrier, a rail also having two bearing faces, and a roller chain having two sets of rollers in different planes interposed between the slipper and the rail.

3. The combination of a foot carrier, a slipper having two bearing faces on the carrier, a rail also having two bearing faces, and a spring roller chain having two sets of rollers in different planes interposed between the slipper and the rail.

4. The combination of a foot carrier, a slipper concave at the middle on the carrier, a rail, and a spring roller chain interposed between the slipper and the rail.

5. The combination of a foot carrier, a slipper having two bearing faces on the carrier one of the said faces being concave at the middle, a rail also having two bearing faces, and a roller chain having two sets of rollers in different planes interposed between the slipper and the rail.

6. The combination of a foot carrier, a slipper having two bearing faces on the carrier one of the said faces being concave at the middle, a rail also having two bearing faces, and a spring roller chain having two sets of rollers in different planes interposed between the slipper and the rail.

7. The combination of an endless chain of foot carriers, slippers on the foot carriers, a rail, a spring roller chain interposed between the slippers and the rail, and means adapted to engage with the carriers and separate the slippers from the spring chain.

8. The combination of an endless chain of foot carriers, slippers on the foot carriers, a rail, a spring roller chain interposed between the slippers and the rail, and means adapted to engage with the carriers and separate the spring chain from the rail.

9. The combination of an endless chain of foot carriers, slippers each with two bearing faces on the carriers, a rail also having two bearing faces, a spring roller chain having two sets of rollers in different planes interposed between the slippers and the rail, and means adapted to engage with the carriers and separate the slippers from the spring chain.

10. The combination of an endless chain of foot carriers, slippers each with two bearing faces on the carriers, a rail also having two bearing faces, a spring roller chain having two sets of rollers in different planes interposed between the slippers and the rail, and means adapted to engage with the carriers and separate the spring chain from the rail.

11. The combination of an endless chain of foot carriers, a pair of slippers pivoted to each carrier one slipper of each pair being in advance of the other, a pair of rails, spring roller chains interposed between the slippers and the rails, and means adapted to engage with the carriers and separate the pair of slippers of each carrier simultaneously from the spring chains.

12. The combination of an endless chain of foot carriers, a pair of slippers pivoted to each carrier all the slippers having two bearing faces and one slipper of each pair being in advance of the other, a pair of rails each also having two bearing faces, spring roller chains each having two sets of rollers in different planes interposed between the slippers and the rails, and means adapted to engage with the carriers and separate the pair of slippers of each carrier simultaneously from the spring chains.

13. The combination of an endless series of foot carriers, rods pivoted to the carriers, feet pivoted to the rods, springs tending to hold the rods stationary relatively to the carriers, and links connecting the carriers together and pivoted to them at points below the pivoted ends of the rods.

14. The combination of an endless series of foot carriers, rods pivoted to the carriers, feet pivoted to the rods, springs tending to hold the feet stationary relatively to the rods, and links connecting the carriers together and pivoted to them at points situated below the pivoted ends of the rods.

15. The combination of an endless series of foot carriers, rods pivoted to the carriers, feet pivoted to the rods, springs surrounding the rods and bearing against the feet, such springs being sufficiently compressed to normally prevent the feet from rising relatively to the carriers but capable of being further compressed, and links connecting the carriers together and pivoted to them at points below the pivoted ends of the rods.

16. The combination of an endless series of foot carriers, rods pivoted to the carriers, feet pivoted to the rods, springs tending to hold the rods stationary relatively to the carriers and rails guiding the carriers and situated below the pivoted ends of the rods.

17. The combination of an endless series of foot carriers, rods pivoted to the carriers, feet pivoted to the rods, springs tending to hold the feet stationary relatively to the rods, and rails guiding the carriers and situated below the pivoted ends of the rods.

18. The combination of an endless series of foot carriers, rods pivoted to the carriers, feet pivoted to the rods, springs surrounding the rods and bearing against the feet, such springs being sufficiently compressed to normally prevent the feet from rising relatively to the carriers but capable of being further compressed, and rails guiding the carriers and situated below the pivoted ends of the rods.

19. The combination of an endless series of foot carriers, rods pivoted to the carriers, feet pivoted to the rods, springs tending to hold the rods stationary relatively to the carriers, and slippers fixed to the carriers at points situated below the pivoted ends of the rods.

20. The combination of an endless series of foot carriers, rods pivoted to the carriers, feet pivoted to the rods, springs tending to hold the feet stationary relatively to the rods, and slippers fixed to the carriers at points situated below the pivoted ends of the rods.

21. The combination of an endless series of foot carriers, rods pivoted to the carriers, feet pivoted to the rods, springs surrounding the rods and bearing against the feet, such springs being sufficiently compressed to normally prevent the feet from rising relatively to the carriers but capable of being further compressed, and slippers fixed to the carriers at points situated below the pivoted ends of the rods.

22. The combination of an endless chain of foot carriers, a rail forming a guide for the carriers, feet pivoted to the carriers, spring always tending to draw adjacent carriers toward each other and means for limiting the separation of the carriers.

BRAMAH JOSEPH DIPLOCK.

Witnesses:
H. D. JAMESON,
C. P. LIDDON.